United States Patent
Scoggin

(10) Patent No.: US 9,714,760 B2
(45) Date of Patent: Jul. 25, 2017

(54) LIGHT FIXTURE INSTALLATION MOUNTING DEVICE

(71) Applicant: Daniel Scoggin, Winfield, MO (US)

(72) Inventor: Daniel Scoggin, Winfield, MO (US)

( * ) Notice: Subject to any disclaimer, the term of this patent is extended or adjusted under 35 U.S.C. 154(b) by 138 days.

(21) Appl. No.: 14/851,689

(22) Filed: Sep. 11, 2015

(65) Prior Publication Data

US 2017/0074499 A1 Mar. 16, 2017

(51) Int. Cl.
- F21S 8/00 (2006.01)
- F21V 23/06 (2006.01)
- H01R 13/73 (2006.01)
- F21V 23/00 (2015.01)
- F21V 21/02 (2006.01)

(52) U.S. Cl.
CPC .............. *F21V 23/06* (2013.01); *F21V 21/02* (2013.01); *F21V 23/001* (2013.01); *H01R 13/73* (2013.01)

(58) Field of Classification Search
CPC ........ F21V 23/06; F21V 21/02; F21V 23/001; H01R 13/73
USPC ....................................................... 362/430
See application file for complete search history.

(56) References Cited

U.S. PATENT DOCUMENTS

| | | | |
|---|---|---|---|
| 3,798,584 A | 3/1974 | Person | |
| 4,952,157 A * | 8/1990 | Hudson | F21V 23/06 439/334 |
| 6,540,372 B2 * | 4/2003 | Joseph | B82Y 15/00 248/609 |
| 6,653,558 B1 * | 11/2003 | Bucher | F21V 21/03 174/50 |
| 6,780,049 B1 | 8/2004 | D'Angelo et al. | |
| 6,799,982 B2 | 10/2004 | Kerr, Jr. | |
| 7,192,303 B2 * | 3/2007 | Kohen | F21V 21/03 439/135 |
| 8,854,796 B2 | 10/2014 | Wilcox | |
| 2003/0060067 A1 * | 3/2003 | Kerr, Jr. | F21V 21/02 439/180 |
| 2006/0285361 A1 * | 12/2006 | Cok | E04B 9/32 362/633 |
| 2007/0147053 A1 * | 6/2007 | Gagne | F21V 21/02 362/404 |
| 2008/0296460 A1 * | 12/2008 | Kerr, Jr. | F21V 21/02 248/343 |
| 2011/0211358 A1 * | 9/2011 | Mize | F21V 21/32 362/430 |

(Continued)

*Primary Examiner* — Bryon T Gyllstrom

(57) ABSTRACT

A light fixture installation mounting device facilitates electrical connection when installing a light fixture. The device includes a base assembly for coupling to a structure. The base assembly includes a mounting bar and a first support bar. Each of a plurality of first electrical couplers extends from the first support bar. First coupler wiring is coupled to each of the first electrical couplers. A connector couples the first support bar to a second support bar such that the second support bar is rotatable relative to the first support bar. Each of a plurality of second electrical couplers extends from the second support bar. Second coupler wiring is coupled to each second electrical coupler. The second electrical couplers engage and couple to the first electrical couplers wherein the first electrical couplers and the second electrical couplers are configured for electrically coupling the light fixture to an electrical source.

12 Claims, 3 Drawing Sheets

(56) References Cited

U.S. PATENT DOCUMENTS

2013/0016504 A1* 1/2013 Garber .................... F21V 21/02
                                                    362/217.16
2014/0078759 A1* 3/2014 Sparks .................... F21V 21/00
                                                    362/430
2014/0268825 A1   9/2014 Lay et al.

* cited by examiner

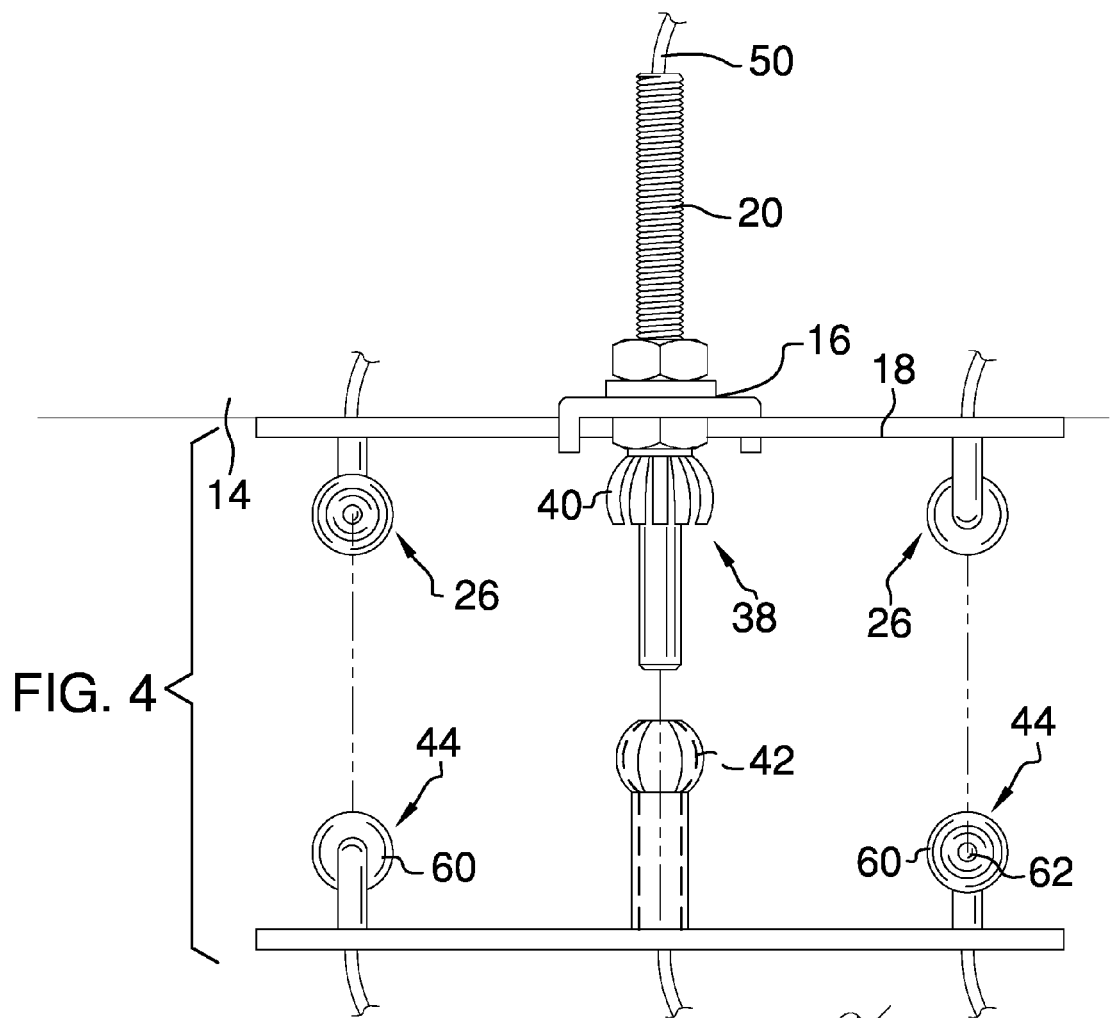
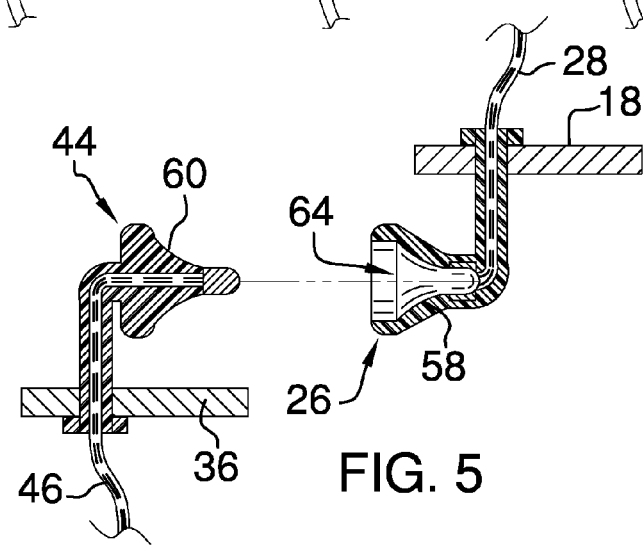

LIGHT FIXTURE INSTALLATION MOUNTING DEVICE

BACKGROUND OF THE DISCLOSURE

Field of the Disclosure

The disclosure relates to mounting devices and more particularly pertains to a new mounting device for facilitating electrical connection of a light fixture when installing and mounting the light fixture.

SUMMARY OF THE DISCLOSURE

An embodiment of the disclosure meets the needs presented above by generally comprising a base assembly configured for coupling to a structure. The base assembly includes a mounting bar and a first support bar coupled to the mounting bar. Each of a plurality of first electrical couplers extends from the first support bar. First coupler wiring is coupled to each of the first electrical couplers wherein the first electrical couplers are configured for electrically coupling to an electrical source. A connector couples the first support bar to a second support bar such that the second support bar is rotatable relative to the first support bar. Each of a plurality of second electrical couplers extends from the second support bar. Second coupler wiring is coupled to each second electrical coupler wherein the second electrical couplers are configured for electrically coupling to a light fixture. The second electrical couplers engage and couple to the first electrical couplers wherein the first electrical couplers and the second electrical couplers are configured for electrically coupling the light fixture to the electrical source.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 4 is a partially exploded front view of an embodiment of the disclosure.

FIG. 5 is a cross-sectional view of an embodiment of the disclosure taken along a line similar to 5-5 of FIG. 4.

DESCRIPTION OF THE PREFERRED EMBODIMENT

Figure 1:
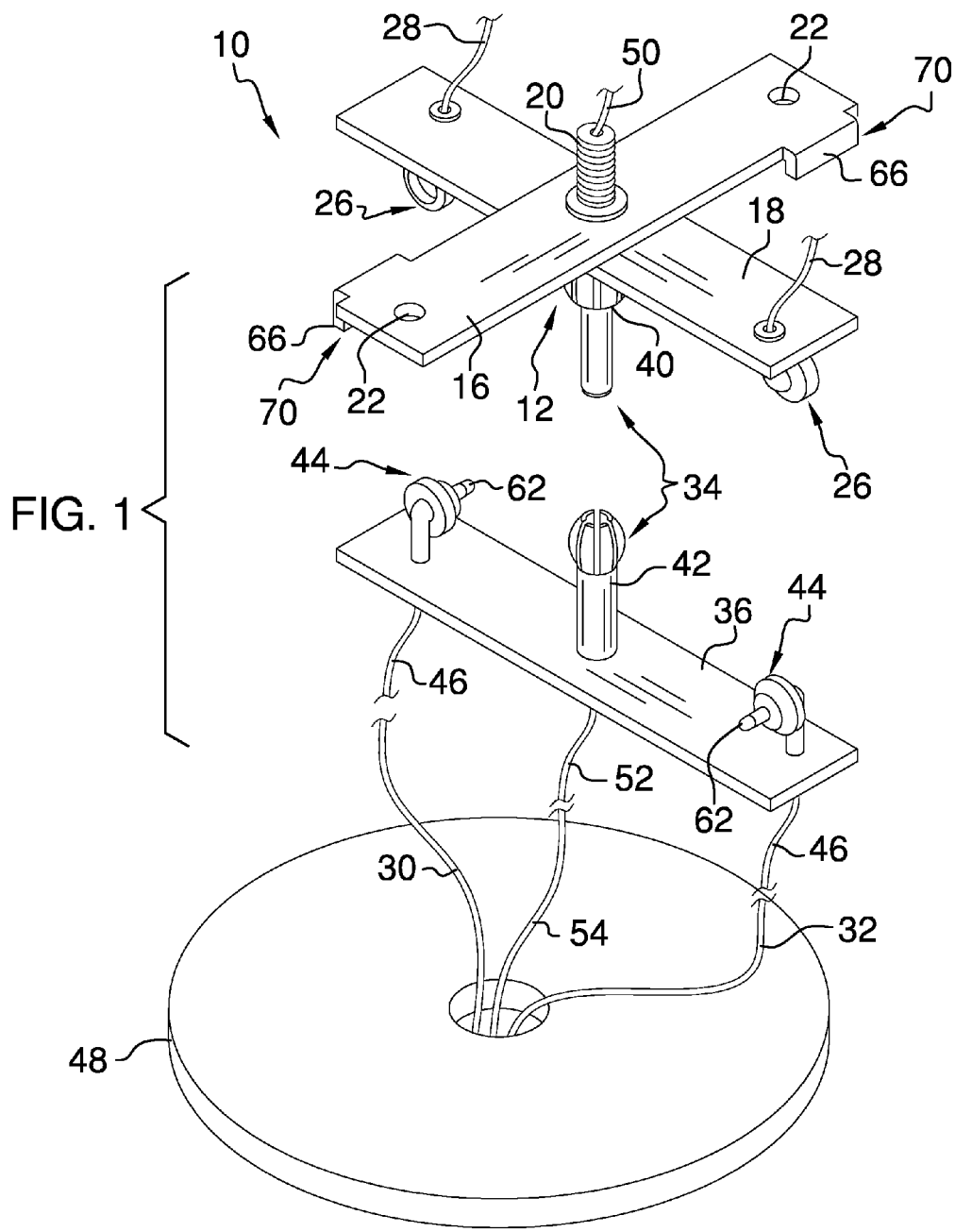
FIG. 1 is a partially exploded top front side perspective view of a light fixture installation mounting device according to an embodiment of the disclosure.
Figure 2:
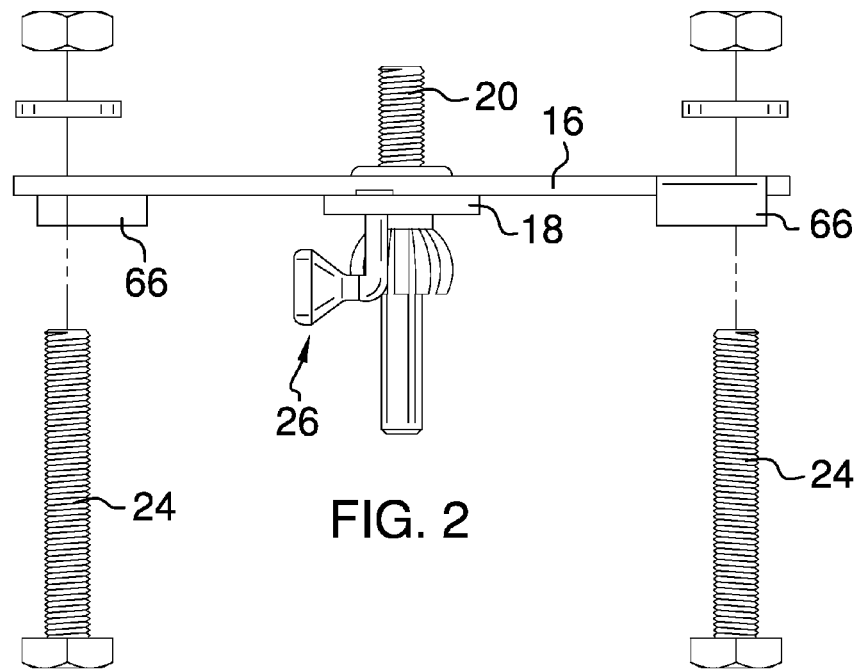
FIG. 2 is a partially exploded side view of a base assembly of an embodiment of the disclosure.
Figure 3:
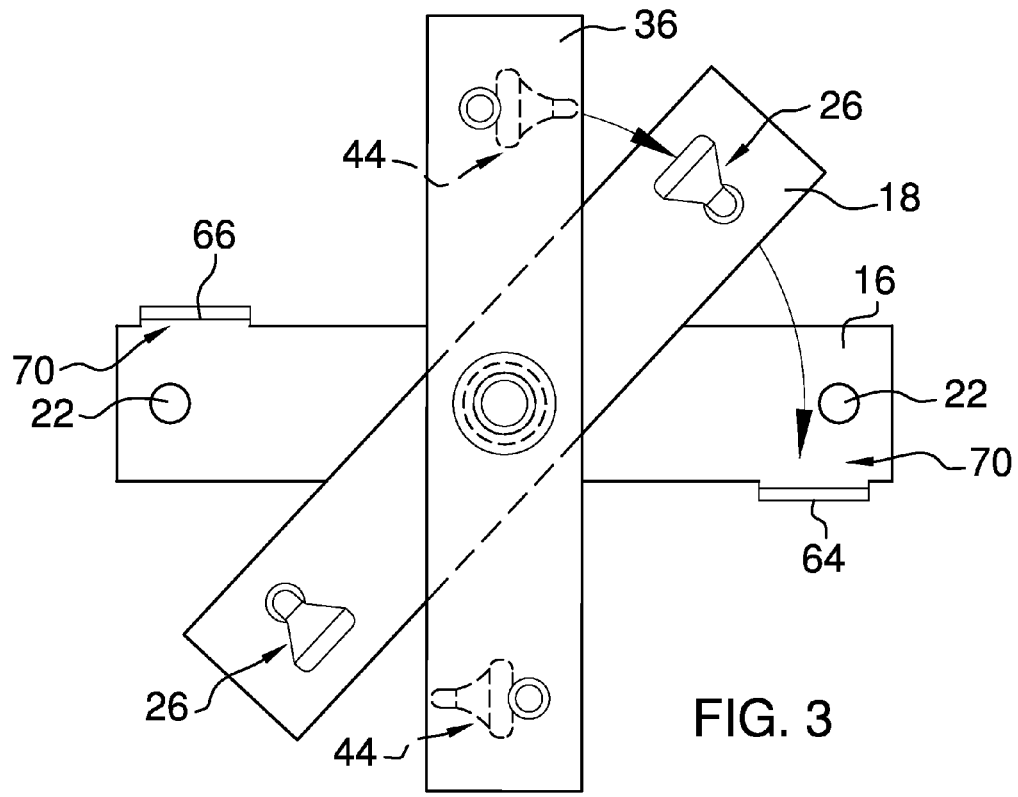
FIG. 3 is a partial top view of an embodiment of the disclosure.

With reference now to the drawings, and in particular to FIGS. 1 through 5 thereof, a new mounting device embodying the principles and concepts of an embodiment of the disclosure and generally designated by the reference numeral 10 will be described.

As best illustrated in FIGS. 1 through 5, the light fixture installation mounting device 10 generally comprises a base assembly 12 configured for coupling to a structure 14. The base assembly 12 includes a mounting bar 16 and a first support bar 18 coupled to the mounting bar 16. The base assembly 12 includes a mounting bolt 20 coupled to and extending upwardly from the mounting bar 16. The mounting bar 16 is structured to have a pair of spaced apertures 22. Each of a pair of secondary bolts 24 is insertable through an associated one of the apertures 22 wherein the mounting bar 16 is further configured for being fixed to the structure 14.

Each of a plurality of first electrical couplers 26 extends from the first support bar 18. First coupler wiring 28 is coupled to each of the first electrical couplers 26 wherein the first electrical couplers 26 are configured for electrically coupling to an electrical source, typically the electrical system of the structure 14 including a hot wire 30 and a neutral wire 32.

A connector 34 couples the first support bar 18 to a second support bar 36 such that the second support bar 36 is rotatable relative to the first support bar 18. The connector 34 is centrally positioned relative to the first support bar 18 and the second support bar 36. The connector 34 is a mushroom connector 38. A female portion 40 of the mushroom connector 38 extends from the first support bar 18 and a male portion 42 of the mushroom connector 38 extends from the second support bar 36. Each of a plurality of second electrical couplers 44 extends from the second support bar 36. Second coupler wiring 46 is coupled to each second electrical coupler 44 wherein the second electrical couplers 44 are configured for electrically coupling to a light fixture 48. The second electrical couplers 44 engage and couple to the first electrical couplers 26 wherein the first electrical couplers 26 and the second electrical couplers 44 are configured for electrically coupling the light fixture 48 to the electrical source.

A first ground wire 50 is coupled to and extends from the female portion 40 through the mounting bar 16 wherein the first ground wire 50 is configured for coupling to a grounding point of the structure 14. A second ground wire 52 is coupled to and extends from the male portion 42 wherein the second ground wire 52 is configured for being electrically coupled to a grounding wire 54 of the light fixture 48. The mushroom connector 38 electrically connects the second ground wire 52 to the first ground wire 50.

Each first electrical coupler 26 defines a female plug 58 and each second electrical coupler 44 defines a complementary male plug 60 wherein rotation of the second support bar 36 inserts each male plug 60 into an associated one of the female plugs 58. Each male plug 60 has a conductive tip 62 electrically contacting the second coupler wiring 46. The conductive tip 62 contacts the first coupler wiring 28 when the male plug 60 is fully inserted into the female plug 58. Each female plug 58 has a cone shaped channel 64 extending into the female plug 58. Thus, the cone shaped channel 64 guides the conductive tip 62 into contact with the first coupler wiring 28 and facilitates alignment of the first support bar 18 with the second support bar 36 as the male plug 60 is fully inserted and engaged to the female plug 58.

Each of a pair of tabs 66 extends from an associated edge 68 of the mounting bar 16 towards the first support bar 18 wherein the tabs 66 define a pair of stops 70 inhibiting rotation of the first support bar 18 relative to the second support bar 36 beyond an aligned position with the mounting bar 16.

In use, first coupler wiring 28 is electrically coupled to the electrical source including the hot wire 30 and neutral wire 32. The first ground wire 50 is coupled to the grounding point. The mounting bar 16 is attached and fixed to the structure 14. The second electrical couplers 44 are electrically connected to the light fixture 48. The second ground wire 52 is coupled to the grounding wire of the light fixture 48. The second support bar 36 is then coupled to the first support bar 18 by inserting the male portion 42 of the mushroom connector 38 into the female portion 40. The second support bar 36 is rotated to insert each second electrical coupler 44 into the appropriate first electrical coupler 26 wherein the electrical connection is completed between the electrical source and the light fixture 48. The light fixture 48 may then be otherwise secured as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A light fixture installation mounting device comprising:
    a base assembly configured for coupling to a structure, said base assembly including a mounting bar and a first support bar coupled to said mounting bar;
    a plurality of first electrical couplers extending from said first support bar;
    first coupler wiring coupled to each of said first electrical couplers wherein said first electrical couplers are configured for electrically coupling to an electrical source;
    a second support bar;
    a connector coupling said first support bar to said second support bar such that said second support bar is rotatable relative to said first support bar;
    a plurality of second electrical couplers extending from said second support bar; and
    second coupler wiring being coupled to each said second electrical coupler wherein said second electrical couplers are configured for electrically coupling to a light fixture, said second electrical couplers engaging and coupling to said first electrical couplers wherein said first electrical couplers and said second electrical couplers are configured for electrically coupling the light fixture to the electrical source.

2. The device of claim 1, further comprising said connector being a mushroom connector.

3. The device of claim 2, further comprising a female portion of said mushroom connector extending from said first support bar and a male portion of said mushroom connector extending from said second support bar.

4. The device of claim 1, further comprising said connector being centrally positioned relative to said first support bar and said second support bar.

5. The device of claim 1, further comprising:
    a first ground wire coupled to and extending from said female portion through said mounting bar wherein said first ground wire is configured for coupling to a grounding point; and
    a second ground wire coupled to and extending from said male portion wherein said second ground wire is configured for being electrically coupled to a grounding wire of the light fixture, said mushroom connector electrically connecting said second ground wire to said first ground wire.

6. The device of claim 1, further comprising each said first electrical coupler defining a female plug and each said second electrical coupler defining a complementary male plug wherein rotation of said second support bar inserts each said male plug into an associated one of said female plugs.

7. The device of claim 6, further comprising each said male plug having a conductive tip electrically contacting said second coupler wiring, said conductive tip contacting said first coupler wiring when said male plug is fully inserted into said female plug.

8. The device of claim 6, further comprising each female plug having a cone shaped channel extending into said female plug.

9. The device of claim 1, further comprising said base assembly including a mounting bolt coupled to and extending from said mounting bar.

10. The device of claim 1, further comprising a pair of tabs, each of said tabs extending from an associated edge of said mounting bar towards said first support bar wherein said tabs define a pair of stops inhibiting rotation of said first support bar relative to said second support bar beyond an aligned position with said mounting bar.

11. The device of claim 1, further comprising:
    said mounting bar being structured to have a pair of spaced apertures;
    a pair of secondary bolts, each of said secondary bolts being insertable through an associated one of said apertures wherein said mounting bar is further configured for being fixed to the structure.

12. A light fixture installation mounting device comprising:
    a base assembly configured for coupling to a structure, said base assembly including a mounting bar and a first support bar coupled to said mounting bar, said base assembly including a mounting bolt coupled to and extending from said mounting bar, said mounting bar being structured to have a pair of spaced apertures;
    a plurality of first electrical couplers extending from said first support bar;
    first coupler wiring coupled to each of said first electrical couplers wherein said first electrical couplers are configured for electrically coupling to an electrical source;
    a second support bar;
    a connector coupling said first support bar to said second support bar such that said second support bar is rotatable relative to said first support bar, said connector being centrally positioned relative to said first support bar and said second support bar, said connector being a mushroom connector, a female portion of said mushroom connector extending from said first support bar and a male portion of said mushroom connector extending from said second support bar;

a plurality of second electrical couplers extending from said second support bar; second coupler wiring coupled to each said second electrical coupler wherein said second electrical couplers are configured for electrically coupling to a light fixture, said second electrical couplers engaging and coupling to said first electrical couplers wherein said first electrical couplers and said second electrical couplers are configured for electrically coupling the light fixture to the electrical source;

a first ground wire coupled to and extending from said female portion through said mounting bar wherein said first ground wire is configured for coupling to a grounding point;

a second ground wire coupled to and extending from said male portion wherein said second ground wire is configured for being electrically coupled to a grounding wire of the light fixture, said mushroom connector electrically connecting said second ground wire to said first ground wire;

each said first electrical coupler defining a female plug and each said second electrical coupler defining a complementary male plug wherein rotation of said second support bar inserts each said male plug into an associated one of said female plugs, each said male plug having a conductive tip electrically contacting said second coupler wiring, said conductive tip contacting said first coupler wiring when said male plug is fully inserted into said female plug, each female plug having a cone shaped channel extending into said female plug;

a pair of tabs, each of said tabs extending from an associated edge of said mounting bar towards said first support bar wherein said tabs define a pair of stops inhibiting rotation of said first support bar relative to said second support bar beyond an aligned position with said mounting bar; and a pair of secondary bolts, each of said secondary bolts being insertable through an associated one of said apertures wherein said mounting bar is further configured for being fixed to the structure.

* * * * *